United States Patent
Rouet et al.

(10) Patent No.: US 7,852,341 B1
(45) Date of Patent: Dec. 14, 2010

(54) METHOD AND SYSTEM FOR PATCHING INSTRUCTIONS IN A SHADER FOR A 3-D GRAPHICS PIPELINE

(75) Inventors: Christian Rouet, San Rafael, CA (US); Rui Bastos, Porto Alegre (BR); Lordson Yue, Foster City, CA (US)

(73) Assignee: Nvidia Corporation, Santa Clara, CA (US)

( * ) Notice: Subject to any disclaimer, the term of this patent is extended or adjusted under 35 U.S.C. 154(b) by 1149 days.

(21) Appl. No.: 10/959,568

(22) Filed: Oct. 5, 2004

(51) Int. Cl.
*G06T 1/20* (2006.01)
*G06F 12/02* (2006.01)

(52) U.S. Cl. ............... 345/506; 345/543; 345/544; 345/545; 345/552; 345/553; 345/554; 345/555; 345/556; 345/557; 345/558; 345/559; 345/560; 345/561; 345/564; 711/137; 711/154; 711/215; 712/211; 712/217

(58) Field of Classification Search ......... 711/137–154, 711/215; 712/211–217; 345/543–565, 501–506
See application file for complete search history.

(56) References Cited

U.S. PATENT DOCUMENTS

| | | | | |
|---|---|---|---|---|
| 5,796,974 | A * | 8/1998 | Goddard et al. .......... | 712/211 |
| 5,950,012 | A * | 9/1999 | Shiell et al. ............ | 717/169 |
| 6,016,474 | A | 1/2000 | Kim et al. | |
| 6,049,672 | A * | 4/2000 | Shiell et al. ............ | 717/168 |
| 6,141,740 | A * | 10/2000 | Mahalingaiah et al. ..... | 711/215 |
| 6,314,493 | B1 * | 11/2001 | Luick .................... | 711/137 |
| 6,438,664 | B1 * | 8/2002 | McGrath et al. .......... | 711/154 |
| 6,631,463 | B1 * | 10/2003 | Floyd et al. ............ | 712/227 |
| 6,839,062 | B2 | 1/2005 | Aronson et al. | |
| 6,891,543 | B2 | 5/2005 | Wyatt | |
| 7,015,909 | B1 | 3/2006 | Morgan, III et al. | |
| 7,486,290 | B1 | 2/2009 | Kilgariff et al. | |
| 2003/0067473 | A1 * | 4/2003 | Taylor et al. ............ | 345/561 |
| 2003/0227461 | A1 * | 12/2003 | Hux et al. ............... | 345/543 |
| 2007/0076010 | A1 * | 4/2007 | Swamy et al. ............ | 345/565 |

OTHER PUBLICATIONS

Parhami, Computer Arithmetic, Oxford University Press, Jun. 2000, pp. 413-418.
gDEBugger, graphicRemedy, http://www.gremedy.com, Aug. 8, 2006.
Duca et al., A Relational Debugging Engine for Graphics Pipeline, International Conference on Computer Graphics and Interactive Techniques, ACM SIGGRAPH 2005, pp. 453-463, ISSN:0730-0301.

* cited by examiner

*Primary Examiner*—Jin-Cheng Wang

(57) ABSTRACT

A method and system for patching instructions in a 3-D graphics pipeline. Specifically, in one embodiment, instructions to be executed within a scheduling process for a shader pipeline of the 3-D graphics pipeline are patchable. A scheduler includes a decode table, an expansion table, and a resource table that are each patchable. The decode table translates high level instructions to an appropriate microcode sequence. The patchable expansion table expands a high level instruction to a program of microcode if the high level instruction is complex. The resource table assigns the units for executing the microcode. Addresses within each of the tables can be patched to modify existing instructions and create new instructions. That is, contents in each address in the tables that are tagged can be replaced with a patch value of a corresponding register.

23 Claims, 7 Drawing Sheets

METHOD AND SYSTEM FOR PATCHING INSTRUCTIONS IN A SHADER FOR A 3-D GRAPHICS PIPELINE

FIELD OF THE INVENTION

Embodiments of the present invention relate to graphics processors. More specifically, embodiments of the present invention relate to patching instructions in a graphics pipeline unit.

BACKGROUND ART

Graphics processing is an important feature of modern high performance computing systems. In graphic processing, mathematical procedures are implemented to render, or draw, graphic primitives, e.g., a triangle or a rectangle, on a display to produce desired visual images. Real time graphics processing requires high speed processing of graphic primitives to produce visually pleasing moving images.

The rendering of three-dimensional graphical images is of interest in a variety of electronic games and other applications. Rendering is the general term that describes the overall multi-step process of transitioning from a database representation of a three-dimensional object to a two-dimensional projection of the object onto a viewing surface, e.g., computer display.

The rendering process involves a number of steps, such as, for example, setting up a polygon model that contains the information which is subsequently required by shading/texturing processes, applying linear transformations to the polygon mesh model, culling back facing polygons, clipping the polygons against a view volume, scan converting/rasterizing the polygons to a pixel coordinate set, and shading/lighting the individual pixels using interpolated or incremental shading techniques.

Graphics Processing Units (GPUs) are specialized integrated circuit devices that are commonly used in graphics systems to accelerate the performance of a 3-D rendering application. GPUs are commonly used in conjunction with a central processing unit (CPU) to generate three-dimensional images for one or more applications executing on a computer system. Modern GPUs typically utilize a graphics pipeline for processing data.

Prior Art FIG. 1 illustrates a simplified block diagram of a graphics system 100 that includes a graphics processing unit 102. As shown, that graphics processing unit 102 has a host interface/front end 104. The host interface/front end 104 receives raw graphics data from central processing hardware 103 that is executing an application program stored in memory 105. The host interface/front end 104 buffers input information and supplies that information to a geometry engine 106. The geometry engine 106 produces, scales, rotates, and projects three dimensional vertices of graphics primitives in "model" coordinates into 2 dimensional frame buffer coordinates. Typically, triangles are used as graphics primitives for three dimension objects, but rectangles are often used for 2-dimensional objects (such as text displays).

The 2 dimensional co-ordinates of the vertices of the graphics primitives are supplied to a rasterizer 108. The rasterizer 108 determines the positions of all of the pixels within the graphics primitives. This is typically performed along raster (horizontal) lines that extend between the lines that define the graphics primitives. The rasterizer 108 also generates interpolated colors, depths and other texture coordinates for each pixel. The output of the rasterizer 108 is referred to as rasterized pixel data.

The rasterized pixel data are applied to a shader 110 that adds texture, color, and optical features related to fog and illumination to the rasterized pixel data to produce shaded pixel data. The shader 110 includes a texture engine 112 that modifies the rasterized pixel data to have desired texture and optical features. The texture engine 112 can be implemented using a hardware pipeline that can process large amounts of data at very high speed. The shaded pixel data is input to a Raster Operations Processor 114 (Raster op in FIG. 1) that performs color blending on the shaded pixel data. The result from the Raster Operations Processor 114 is frame pixel data that is stored in a frame buffer memory 120 by a frame buffer interface 116. The frame pixel data can be used for various processes such as being displayed on a display 122. Frame pixel data can be made available as required by way of the frame buffer interface 116.

The stages of the traditional GPU pipeline architecture illustrated in FIG. 1 may be typically optimized for high-speed rendering operations (e.g., texturing, lighting, shading, etc.) using a widely implemented graphics programming API (application programming interface), such as, for example, the OpenGL™ graphics language, Direct3D™, and the like. The architecture of the graphics processing unit 102 is configured as a multi-stage deep pipeline architecture in order to maximize the overall rendering throughput of the pipeline. Generally, deep pipeline architectures have sufficient data throughput (e.g., pixel fill rate, etc.) to implement fast, high quality rendering of even complex scenes.

A particular issue in the GPU processing unit of FIG. 1 is that the scheduling of high level instructions (operational codes) in the shader 110 is inflexibly hard coded into the chip platform that contains the GPU processing unit 102. The scheduling process translates a stream of high level instructions (e.g., operational codes) into a very long instruction word (VLIW) that is executed in the shader 110. However, errors within the scheduling process are difficult to repair. Moreover, modifications to the scheduling process generally cannot be made. As a result, performance within the shader 110 suffers because of the limitations introduced by errors in the scheduling process. Therefore, what is desired is a scheduling process that is suitable for repair and modification.

SUMMARY OF THE INVENTION

Accordingly, the present invention provides, in various embodiments, a method and system for patching instructions in a shader pipeline of a 3-D graphics pipeline. The present invention provides for the repair, modification, and introduction of new high level instructions within the scheduling process that transforms a stream of high level instructions (e.g., operational codes) into a stream of very long instruction words (VLIWs) that are then executed within the shader pipeline of a 3-D graphics pipeline.

Embodiments of the present invention pertain to methods and systems for patching instructions in a 3-D graphics pipeline. Specifically, in one embodiment, high level instructions to be executed within a scheduling process for a shader pipeline of the 3-D graphics pipeline are made patchable herein. A scheduler for implementing the scheduling process is described in three stages. A first stage includes a decode table for translating a high level instruction to an appropriate microcode for execution of the high level instruction when the high level instruction is simple. The first stage also provides entry into a patchable expansion table when the high level instruction is complex. A second stage includes the patchable expansion table for translating the high level instruction into a program of microcode when the high level instruction is complex. A third stage includes a patchable resource lookup table for determining a first available unit in the shader pipeline that can execute a particular microcode associated with executing the high level instruction. The resource lookup table provides a list of units in a shader pipeline that can execute the particular microcode.

In another embodiment, a method for patching instructions in a graphics pipeline is disclosed. Specifically, addresses within each of the decode, expansion and resource tables can be patched to modify existing instructions and create new instructions. That is, contents in each address in the tables that are tagged can be replaced with a patch value of a corresponding register. In particular, an address is accessed in one of the patchable lookup tables (e.g., decode, expansion, and resource tables). The contents of the address provide execution information that is associated with the high level instruction. In addition, the address is compared to a list of tagged addresses to determine if the address is tagged for patching. If the address is tagged for patching, an associated register is accessed to read a patch value. The patch value is selected as a replacement for the content of the address in the lookup table, implemented in read only memory (ROM), and is used for further processing of the high level instruction. The ROM lookup table, though hardwired, is a highly efficient implementation of a lookup table, as opposed to random access memory (RAM) which is significantly larger in area and has longer latency.

In still another embodiment, a scheduler for a shader pipeline in a 3-D graphics pipeline is disclosed that is capable of patching instructions. The scheduler includes a ROM lookup table that includes a plurality of addresses containing execution information for a plurality of high level instructions. A plurality of address tags is also included each identifying an address in the lookup table whose contents are tagged for patching. The scheduler also includes a patch block that contains a plurality of patch values for replacing contents of addresses that are tagged in the lookup table. A comparator in the scheduler determines when contents of an address in said lookup table associated with a high level instruction are tagged for patching, and determines a corresponding patch value for replacing the contents of the address. A multiplexor selects the accessed contents when the address is not tagged for patching, and selects the corresponding patch value when the address is tagged for patching for further processing of the high level instruction.

In its various embodiments, the present invention can significantly expand the functionality of the scheduling process of a shader by providing high level instructions that can be modified or newly created through a multistage scheduling process that is implemented with patchable ROM, memory, e.g., lookup tables.

BRIEF DESCRIPTION OF THE DRAWINGS

The accompanying drawings, which are incorporated in and form a part of this specification, illustrate embodiments of the present invention and, together with the description, serve to explain the principles of the invention.

Prior Art

DETAILED DESCRIPTION OF THE INVENTION

Figure 1:
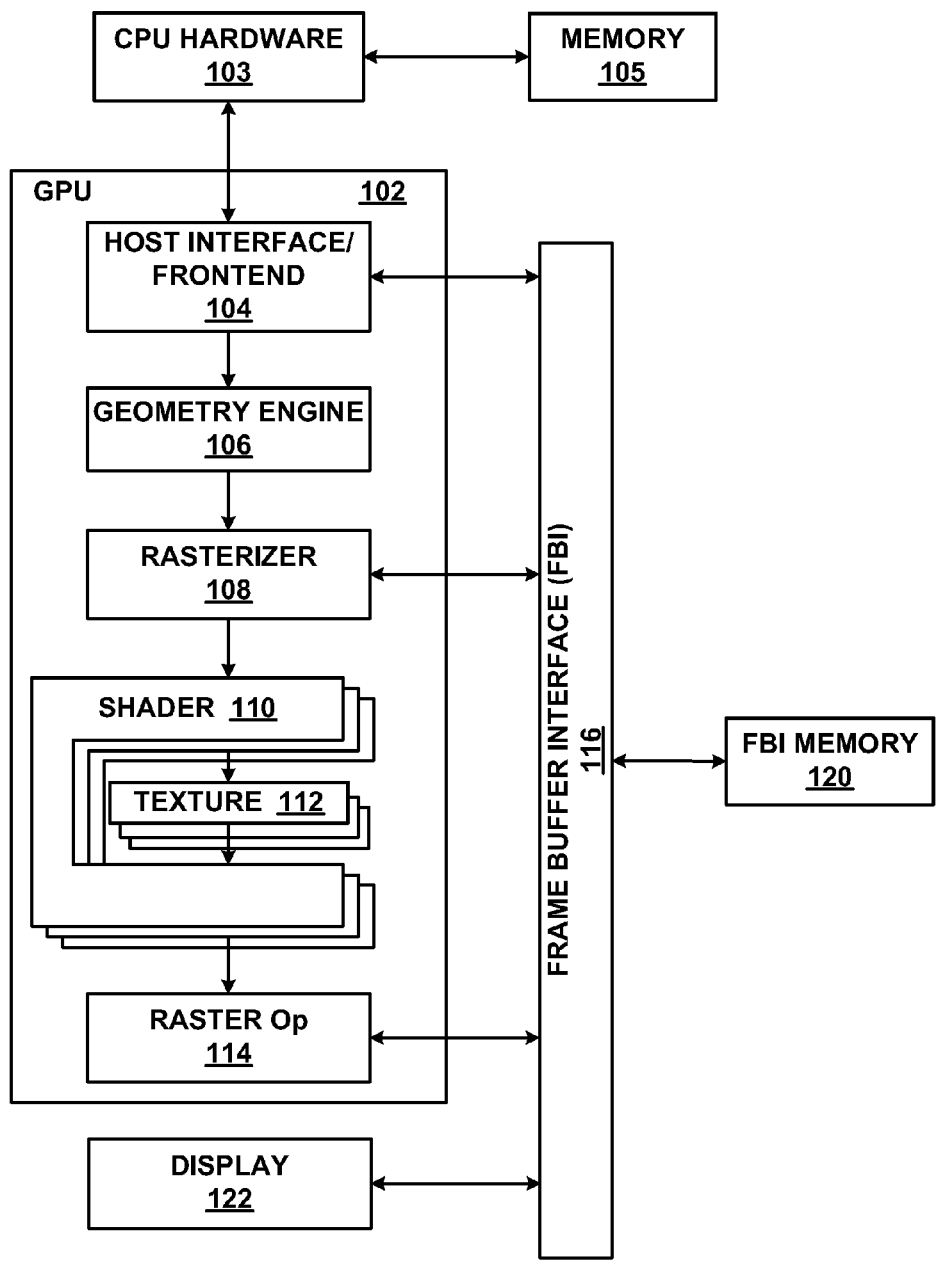
FIG. 1 shows a diagram depicting the various stages of a traditional prior art pipeline.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

In general, embodiments of the present invention are capable of patching instructions in a scheduler of a shader pipeline in a 3-D graphics pipeline. Specifically, the present invention provides for the repair, modification, and introduction of new high level instructions within the scheduling process that transforms a stream of high level instructions (e.g., operational codes) into a stream of very long instruction words (VLIWs) that are then executed within the shader pipeline of a 3-D graphics pipeline. These provisions result in significant expansion of the functionality of the scheduling process of a shader by providing high level instructions that can be modified or newly created through a multistage scheduling process that is implemented with patchable lookup tables (e.g., read only memory [ROM] lookup tables). Embodiments of the present invention and their benefits are further described below.

Although embodiments of the present invention are disclosed within a graphics pipeline, other embodiments are well suited for implementation within similar pipelines of varying nomenclature that render pixelated data, such as video pipelines, and the like, etc.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "determining" or "selecting" or "comparing" or "patching" or the like, refer to the action and processes of a computer system (e.g., computer system 200 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Figure 2:
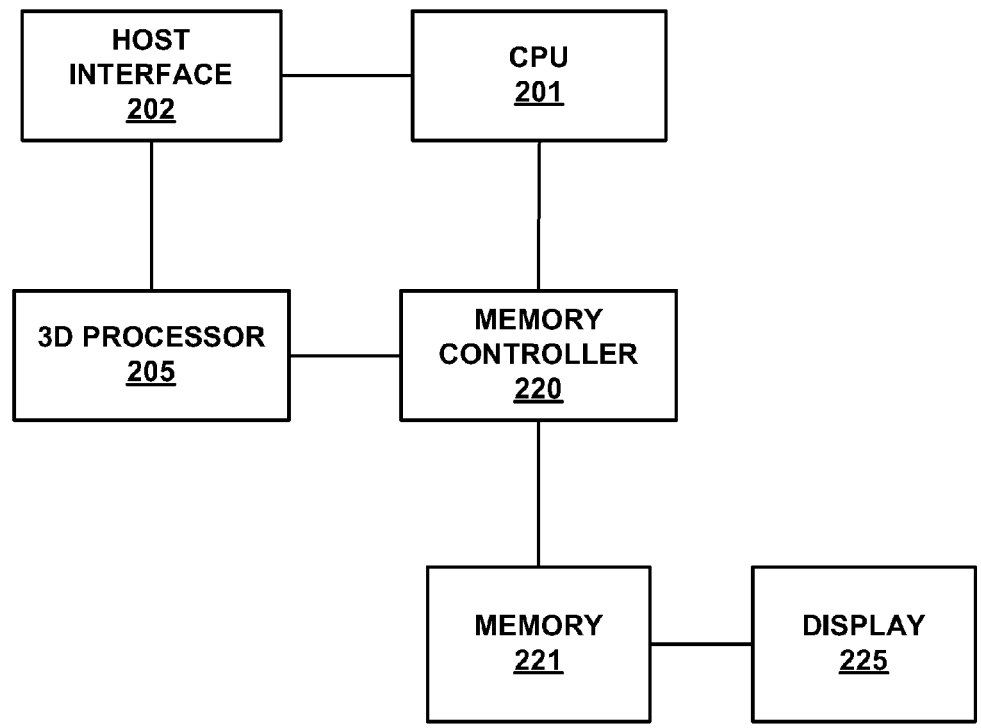
FIG. 2 shows a computer system in accordance with one embodiment of the present invention.

Computer System Platform:

With reference now to FIG. 2, an exemplary computer system 200 in accordance with one embodiment of the present invention is shown. Computer system 200 in accordance with one embodiment of the present invention may provide the execution platform for implementing certain software-based functionality of the present invention. As depicted in FIG. 2, the computer system 200 includes a CPU 201 coupled to a graphics processor 205 via a host interface 202. The host interface 202 translates data and commands passing between the CPU 201 and the graphics processor 205 into their respective formats. Both the CPU 201 and the graphics processor 205 are coupled to a memory 221 via a memory controller 220. In the system 200 embodiment, the memory 221 is a shared memory, which refers to the property whereby the memory 221 stores instructions and data for both the CPU 201 and the graphics processor 205. Access to the shared memory 221 is through the memory controller 220. The shared memory 221 also stores data comprising a video frame buffer which drives a coupled display 225.

As described above, certain processes and steps of the present invention are realized, in one embodiment, as a series of instructions (e.g., software program) that reside within computer readable memory (e.g., memory 221) of a computer system (e.g., system 200) and are executed by the CPU 201 and graphics processor 205 of system 200. When executed, the instructions cause the computer system 200 to implement the functionality of the present invention as described below.

Additionally, it should be appreciated that although the components 201-225 are depicted in FIG. 2 as discrete components, several of the components 201-225 can be implemented as a single monolithic integrated circuit device (e.g., a single integrated circuit die) configured to take advantage of the high levels of integration provided by modern semiconductor fabrication processes. For example, in one embodiment, the CPU 201, host interface 202, graphics processor 205, and memory controller 220 are fabricated as a single integrated circuit die.

Figure 3:
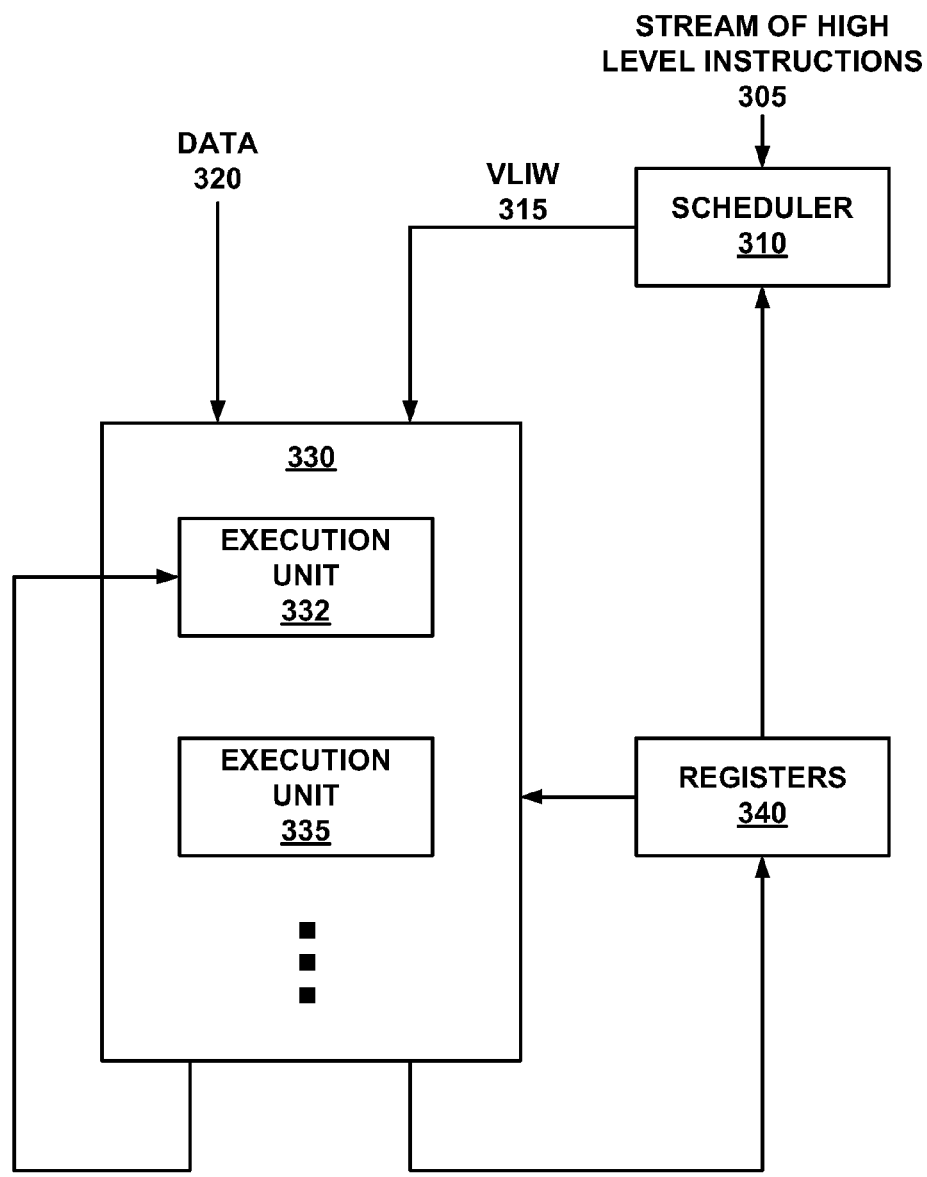
FIG. 3 is a data flow diagram illustrating the scheduling process implemented in executing high level instructions using VLIW words in a shader pipeline, in accordance with one embodiment of the present invention.

FIG. 3 is an exemplary block diagram illustrating the scheduling process implemented for executing high level instructions in a shader pipeline, in accordance with one embodiment of the present invention. In general, the scheduling process examines the incoming stream of high level instructions (e.g., operational codes) for the shader pipeline 330 and allocates execution units within the shader pipeline 330 to best handle execution of the stream of high level instructions.

In particular, the scheduler 310 schedules and translates a stream of high level instructions 305 into a stream of low level very long instruction words (VLIWs) 315 that are microcode understandable by the execution units of the shader pipeline 330. In one embodiment, the VLIW is suitable for parallel execution in the shader pipeline 330.

The scheduler provides the VLIW 315 to the shader pipeline 330. The VLIW 315 provides execution instructions to each of the execution units (e.g., execution units 332 and 335 in the shader pipeline 330. Pixel data 320 is sent to the shader pipeline 330 for processing after the execution units in the shader pipeline 330 have been instructed by the VLIW 315.

The output from the shader pipeline 330 may be recirculated back through the shader pipeline 330 in an iterative process until processing of the pixel data 320 is completed. The registers 340 provide necessary input data for the execution units in the shader pipeline 330 as requested by the VLIW. In addition, a path from the output of the shader pipeline 330 back to the scheduler 310 allows the scheduler to monitor the shader pipeline 330 as well as the registers for scheduling purposes. The register data can contain per pixel state information that can alter the program flow, such as in a program branch.

Figure 4A:
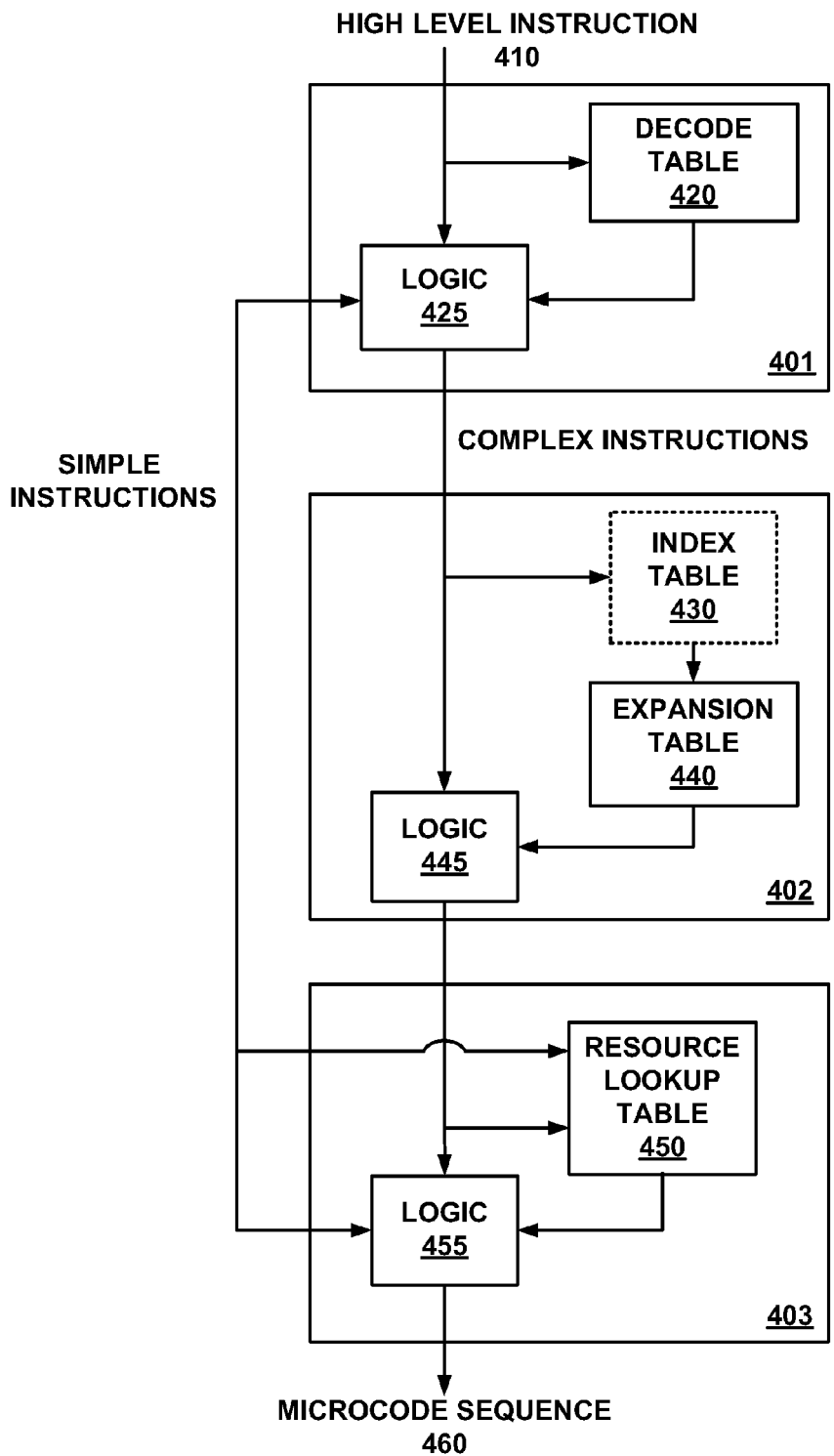
FIG. 4A is a data flow diagram illustrating the generation of a VLIW sequence from high level instructions in a scheduler including lookup tables with patchable contents of a shader pipeline, in accordance with one embodiment of the present invention.

FIG. 4A is a data flow diagram 400A of the scheduler 310 of FIG. 3, in accordance with one embodiment of the present invention. The data flow diagram of FIG. 4A illustrates the scheduling process in which a high level instruction (e.g., operational code) 410 is translated into microcode 460 that is understandable by execution units within a shader pipeline. The high level instruction is comprised of several fields, such as the operational code, definition registers, source definition modifiers, condition codes, etc. Additionally, the data flow diagram of FIG. 4A can be expanded to illustrate the scheduling process in which a stream of high level instructions are translated into a stream of VLIW made up of sequences of microcode.

In particular, the scheduling process implemented within the data flow diagram of FIG. 4A can be described in three stages, according to one embodiment. A high level instruction sequence 410 that is processed through the three stages is translated into microcode 460.

A first stage 401 includes a logic block 425 and a patchable decode table 420 that decodes the high level instruction sequence. Each addressable entry in the decode table describes the high level instruction as described by attributes within the fields of the entry. For instance, the attributes may define the number and type of inputs required by the high level instruction 410, whether the instruction is of a first type (e.g., simple instruction), whether the instruction is of a second type (e.g., complex instruction), etc. As a further example, the decode table 420 in addition to the logic block 425 are used to convert an operational code to an internal microcode format for further processing. In one embodiment, the patchable decode table is a ROM lookup table.

Table 1 illustrates exemplary entries for the decode table 420. The fields in the entry define attributes associated with an associated high level instruction, such as, high level instruction 410.

TABLE 1

Entries for Decode Lookup Table

```
// 00: suffix, d a b c execM C1 uExp, uPers, tex, prj, hem
{ /*MUL*/hxcsSuf,4,4,4,0,W1111,3, eNon,     0,    0,    0,    0},
...
{ /*TXBM*/csSuf,4,2,2,4,E1111,1, eTXM,      1,    1,    0,    1};
```

In general, the first stage includes a patchable decode table 420 and logic block 425. The logic block receives as an input the high level instruction 410 and the output of the decode table 420. The decode table 420 keys off specific information contained in the high level instruction, such as the operational code. The logic block 425 provides further decoding of the additional information (e.g., operands, modifiers, etc.) contained in the high level instruction 410 and provides further functionality to generate internal microcode that provides further instructions and indicates if the high level instruction is a simple or complex instruction. For instance, the logic block 425 is able to implement information from prior clocks, as history information, that is used in processing the high level instruction 410.

If the high level instruction is simple, the first stage 401 translates the high level instruction 410 to an appropriate microcode for execution of the high level instruction 410. That is, the first stage 401 provides the appropriate microcode sequence (e.g., from the decode table 420) that can be executed by execution units. In a sense, there is a one-to-one correspondence between the high level instruction 410, it's operands, modifiers, and the resultant microcode 460 created by the overall decoding process. For instance, an "MUL" function is a simple high level instruction. The decode table 420 able to provide the translation for "MUL" high level instruction. An exemplary "MUL" instruction is illustrated in Table 1.

On the other hand, if the high level instruction 410 is of a second type (e.g., complex instruction), the first stage also provides entry into a second stage 402 that includes a patchable expansion table 440. A complex high level instruction requires more than one executable microcode. The expansion table 440 provides a program or sequence of microcode that is associated with a complex high level instruction. For instance, the high level instruction "TXBM" in Table 1 is a complex instruction.

The second stage 402 includes the patchable expansion table 440 and a corresponding logic block 445 for translating the high level instruction into a program of microcode when the high level instruction is complex. The expansion table 440 is coupled to receive data from the decode table through the logic block 425.

Specifically, in one embodiment, the second stage includes both the optional index table 430 and the expansion table 440. In other embodiments of the present invention, the expansion table 440 is capable of performing the functions of the index table 430. In one embodiment, the expansion table 440 is a ROM lookup table.

The index table 430 is also patchable and is coupled to receive data from the decode table 420 through the logic block 425. The index table 430 is used to determine an appropriate address in the patchable expansion table 440 that is associated with the high level instruction 410. The appropriate address is dependent on the type of attributes that are associated with the high level instruction 410. For instance, in one embodiment, the appropriate address is determined by the type of inputs required by the high level instruction. As such, if the high level instruction requires 3 inputs, there are eight possible programs of microcode possible that are associated with the high level instruction. If the high level instruction requires 2 inputs, there are four possible programs of microcode possible that are associated with the high level instruction. In one embodiment, the index table 430 is a ROM lookup table.

The logic block 445 receives as an input the internal microcode from the logic block 425 of the first stage 401 and the output of the expansion table 440. The logic block 445 combines information (e.g., operands, modifiers, etc.) contained in the high level instruction 410 as processed through the first stage 401 and provides further functionality to generate the program of microcode. For instance, the logic block 425 is able to implement information from prior clocks, as history information, that is used in processing the high level instruction 410. The data outputted from the logic block 445 is in the form of associated microcode that execute the high level instruction 410.

Table 2 illustrates exemplary entries for expansion table 440. For instance, the entries in Table 2 are associated with the complex high level instruction "TXBM" of Table 1. Because "TXBM" is described as having three inputs, there are up to eight possible programs (118, 121, 126, 131, 135, 141, and 147) of sequences of microcode, as illustrated in Table 2.

TABLE 2

Entries for "TXBM" Expansion Table

```
//118:eTXM
{    3, uD2A,    T|X,     B, C,          A|SX },
{    2, uD2A,    T|Y,     B, SZWZW,      A|SY },
{    1, uTEX,    D,       T, 0,          0    },
//121:eTXM_a
{    5, uDIV,    T|X|Y,   A, _W,         0    },
{    4, uDP2,    T|W,     B, C|SZWZW,    0    }, // co-issue
{    3, uDP2,    T|Z,     B, C,          0    },
{    2, UADD,    T|X|Y,   T|SZWZW,T,     0    },
{    1, uTEX,    D,       T, 0,          0    },
//126:eTXM_b==eTSM_c
{    5, uDP2,    T|W,     B, C|SZWZW,    0    }, // co-issue
{    4, uDP2,    T|Z,     B, C,          0    },
{    3, uDIV,    T|Z|W,   T, _W,         0    },
{    2, UADD,    T|X|Y,   T|SZWZW,A,     0    },
{    1, uTEX,    D,       T, 0,          0    },
//131:eTXM_ab==eTXM_ac
{    4, uD2A,    T|X,     B, C,          A|SX },
{    3, uD2A,    T|Y,     B, SZWZW,      A|SY },
{    2, uDIV,    T|X|Y,   T, _W,         0    },
{    1, uTEX,    D,       T, 0,          0    },
//135:eTXM_bc
{    6, uDIV,    T,       C, _W,         0    },
{    5, uDP2,    T|W,     B, T|SZWZW,    0    }, // co-issue
{    4, uDP2,    T|Z,     B, C,          0    },
{    3, uDIV,    T|X|Y,   T|SZWZW, W,    0    },
{    2, uADD,    T|X|Y,   T, A,          0    },
{    1, uTEX,    D,       T, 0,          0    },
//141:eTXM_abc
{    6, uDP2,    T|W,     B, C|SZWZW,    0    }, // co-issue
{    5, uDP2,    T|Z,     B, C,          0    },
{    4, uDIV,    T|X|Y,   T|SZWZW, W,    0    },
{    3, uADD,    T|X|Y,   T, A,          0    },
{    2, uDIV,    T|X|Y,   T, _W,         0    },
{    1, uTEX,    D,       T, 0,          0    },
//141:eTXM_3regs
{    4, uDP2,    T|W,     B, C|SZWZW,    0    }, // co-issue
{    3, uDP2,    T|Z,     B, C,          0    },
{    2, UADD,    T|X|Y,   T|SZWZW,A,     0    },
{    1, uTEX,    D,       T, 0,          0    },
```

A third stage 403 includes a patchable resource lookup table 450 and a logic block 455. The resource table 450 is coupled to receive the previously described data from the decode table 420 through logic block 425 and the expansion table 440 through logic block 445. The resource table 450 in combination with the logic block 455 are used to determine a first available unit in the shader pipeline that can execute a microcode, for a simple instruction, or microcode, for a complex instruction, associated with executing the high level instruction 410. The resource lookup table 450 provides a list of units in a shader pipeline that can execute the associated microcode element or elements. In one embodiment, the patchable resource lookup table 450 is a ROM lookup table.

The logic block 455 combines information (e.g., operands, modifiers, etc.) contained in the high level instruction 410 as processed through the first and second stages 401 and 402, respectively, and provides further functionality to generate the microcode sequence 460 that is executed at the various selected execution units. For instance, the logic block 425 is able to implement information from prior clocks, as history information, that is used in processing the high level instruction 410. As such, microcode resulting from the high level instruction can be placed into a history file in the logic block 455 to be processed in the next clock cycle or to be used as input information in later clock cycles.

Table 3 illustrates an exemplary entry for the resource table 450, in accordance with one embodiment of the present invention. Table 3 lists the available execution units in a shader pipeline that can execute the "MUL" microcode. Five execution units are available in the shader pipeline. The execution units in the shader pipeline that can execute the "MUL" microcode are as follows: SCT0, SCT1, SRB, SCB0, and SCB1.

TABLE 3

Entry for Resource Lookup Table

| //00 | SCT01 | TEXSRB | SCB01 |
|---|---|---|---|
| /*MUL*/ | { Either, | None, | Eiether, Compwise} |

In one embodiment, each of the decode table 420, index table 430, expansion table 440, and the resource table 450 comprise read only memory (ROM) lookup tables. Other embodiments are well suited to supporting other types of lookup tables for the decode table, index table, expansion table, and the resource table. Each of the entries are preloaded to provide the scheduling and translating of high level instruction into microcode in a scheduler of a shader pipeline, in one embodiment. However, the entries in each of these tables are patchable, or replaced, with content in associated registers, as will be described in full below in relation to the remaining figures.

Figure 4B:
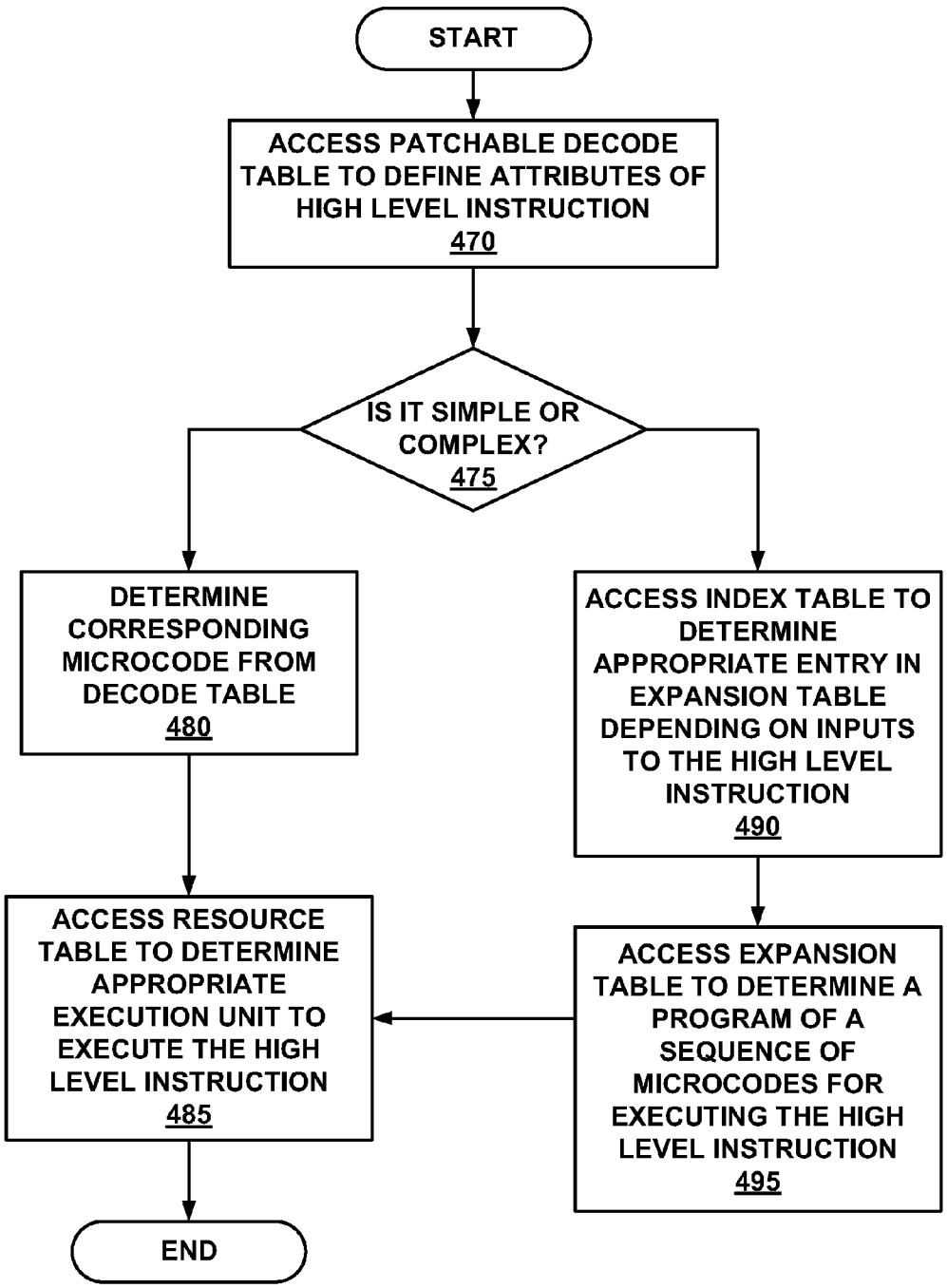
FIG. 4B is a flow diagram illustrating steps in a computer implemented method for generating a VLIW sequence from high level instructions in a scheduler including lookup tables with patchable contents of a shader pipeline, in accordance with one embodiment of the present invention.

FIG. 4B is a flow chart 400B illustrating a computer implemented process for a method of scheduling and translating a high level instruction to microcode or a sequence of microcode in a scheduler of a shader pipeline associated with a 3-D graphics pipeline, in accordance with one embodiment of the present invention. The method of flow chart 400B can be implemented with patchable ROM lookup tables, such that the instructions within the scheduling process can be repaired, modified, and newly created, in one embodiment. That is, the patchable ROM lookup table includes entries that may be replaced with content in associated registers. While the present embodiment is disclosed using ROM lookup tables for illustrative purposes only, and is well suited to using other types of lookup tables.

The flow chart 400B can be described in three major stages. The first stage comprises 470, 475, and 480. The second stage comprises 490 and 495. The third stage comprises 485.

In the first stage, at 470, the present embodiment accesses a patchable decode table in order to decode a high level instruction (e.g., operational code). As described previously, in the decoding process, the present embodiment determines attributes of the high level instruction that is input into a scheduler. Specifically, at 470, the scheduler begins the process to determine an appropriate microcode sequence for execution of the high level instruction.

Each of the entries in the decode table are patchable. That is, the present embodiment can replace the contents of an entry in the decode table with contents, or a patch value, from a register.

At 475, the present embodiment determines if the high level instruction is a simple instruction or a complex instruction. The decode table provides this information. If the high level instruction is simple, the present embodiment proceeds to 480. If the high level instruction is complex, the present embodiment proceeds to 490.

At 480, the present embodiment determines the corresponding microcode from the decode table. Specifically, since the high level instruction is simple, there is a one-to-one relationship between the high level instruction and a single microcode that is executable by one of the execution units in the shader pipeline. The decode table provides key information to perform this one-to-one translation.

In the second stage, at 490, the present embodiment accesses an index table if the high level instruction is complex. The index table provides information to determine an appropriate entry in an expansion table to use for executing the high level instruction. As described previously, a number of programs of microcode sequences may be associated with a high level instruction depending on the number and type of inputs required by the high level instruction. The expansion table includes those programs that can execute the high level instruction.

At 495, the present embodiment accesses the patchable expansion lookup table to translate the high level instruction to a program of microcode. That is, the complex high level instruction has been translated to a sequence of microcode that is executable by units in the shader pipeline to execute the high level instruction.

At 485, the present embodiment takes the microcode output from 480 for a simple high level instruction or the program of microcode output from 495 for a complex high level instruction and accesses the resource table in order to assign the appropriate execution unit in the shader pipeline that is used to execute the high level instruction. As described previously, the resource table includes entries that list the execution units in the shader pipeline and their corresponding ability to execute each of the microcode available in the hardware of the shader pipeline.

In one embodiment, for a particular microcode associated with executing the high level instruction, the first available unit that can execute the particular microcode is assigned. That is, more than one execution unit can possibly execute the particular microcode. For example, from table 3, the "MUL" microcode can be executed in either execution unit SCT0 or SCT1. As such, if SCT0 has already been assigned, then the present embodiment will assign execution unit SCT1, if available, to execute the "MUL" microcode.

Figure 5:
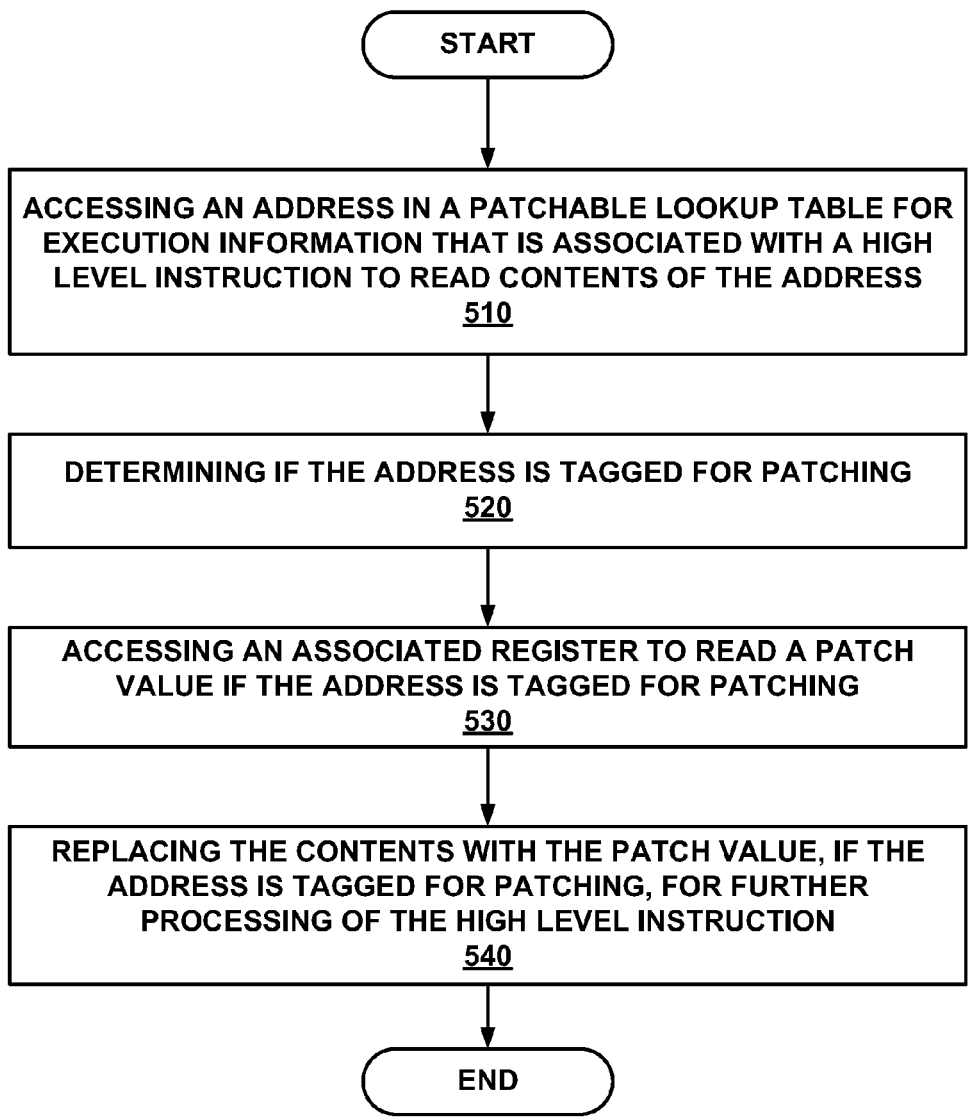
FIG. 5 is a flow chart illustrating steps in a computer implemented method for patching instructions in a lookup table, in accordance with one embodiment of the present invention.

FIG. 5 is a flow chart 500 illustrating a computer implemented process for a method of patching a high level instruction in a scheduler of a shader pipeline associate with a 3-D graphics pipeline, in accordance with one embodiment of the present invention. In one embodiment, the flow chart 500 is an extension of 470, 485, 490, and 495 in flow chart 400B of FIG. 4B.

At 510, the present embodiment accesses an address in a patchable ROM lookup table for execution information that is associated with a high level instruction. The address is accessed to read contents of the address. For instance, at 510, the present embodiment accesses an address that is associated with a high level instruction in a decode table 420, or an index table 430, or an expansion table 440, or a resource table 450 of FIG. 4A.

At 520, the present embodiment determines if the address that is accessed is tagged for patching. If the address is not tagged for patching, then the content of the address in the ROM lookup table are used to schedule the high level instruction in the shader pipeline.

On the other hand, if the address is tagged for patching, then the present embodiment at 530 accesses an associated register that contains a patch value that replaces the contents of the address in the ROM lookup table.

At 540, the present embodiment selects the patch value as a replacement for the contents of the address for further processing of the high level instruction. That is, the present embodiment reads the patch value from the associated register and uses the patch value to schedule the high level instruction in the shader pipeline.

In particular, embodiments of the present invention are capable of replacing, modifying, or creating new high level instructions by patching the entries in the ROM lookup tables. For instance, in the decode table, if an entry associated with a high level instruction incorrectly identifies the instruction as being simple, when it should be defined as complex, that entry can be patched with a corresponding register whose contents identify the high level instruction as being complex.

Moreover, the expansion table provides the capabilities to repair errors in an existing program of microcode, as well as modify an existing program of microcode by patching an entry with a corresponding register whose contents includes the repaired program of microcode, or the modified program of microcode.

In addition, the expansion able provides the capability to support new high level instructions. For instance, new application program interfaces utilizing the shader pipeline may implement new high level instructions that previously were not supported by the scheduler associated with the shader pipeline.

However, the present embodiment is capable of supporting the new high level instruction. In one embodiment, if entry space is available in each of the decode, index, and expansion tables, then patching those unused entries with execution information to support the new high level instruction can be implemented. For instance, an unused entry in the expansion table can be patched with a new program of microcode to support the new high level instruction.

On the other hand, if there are no available entries in each of the tables, one of the existing high level instructions can be modified through patching its associated entries in the decode, index, and expansion tables. In that case, the previously existing high level instruction would no longer be supported.

Figure 6:
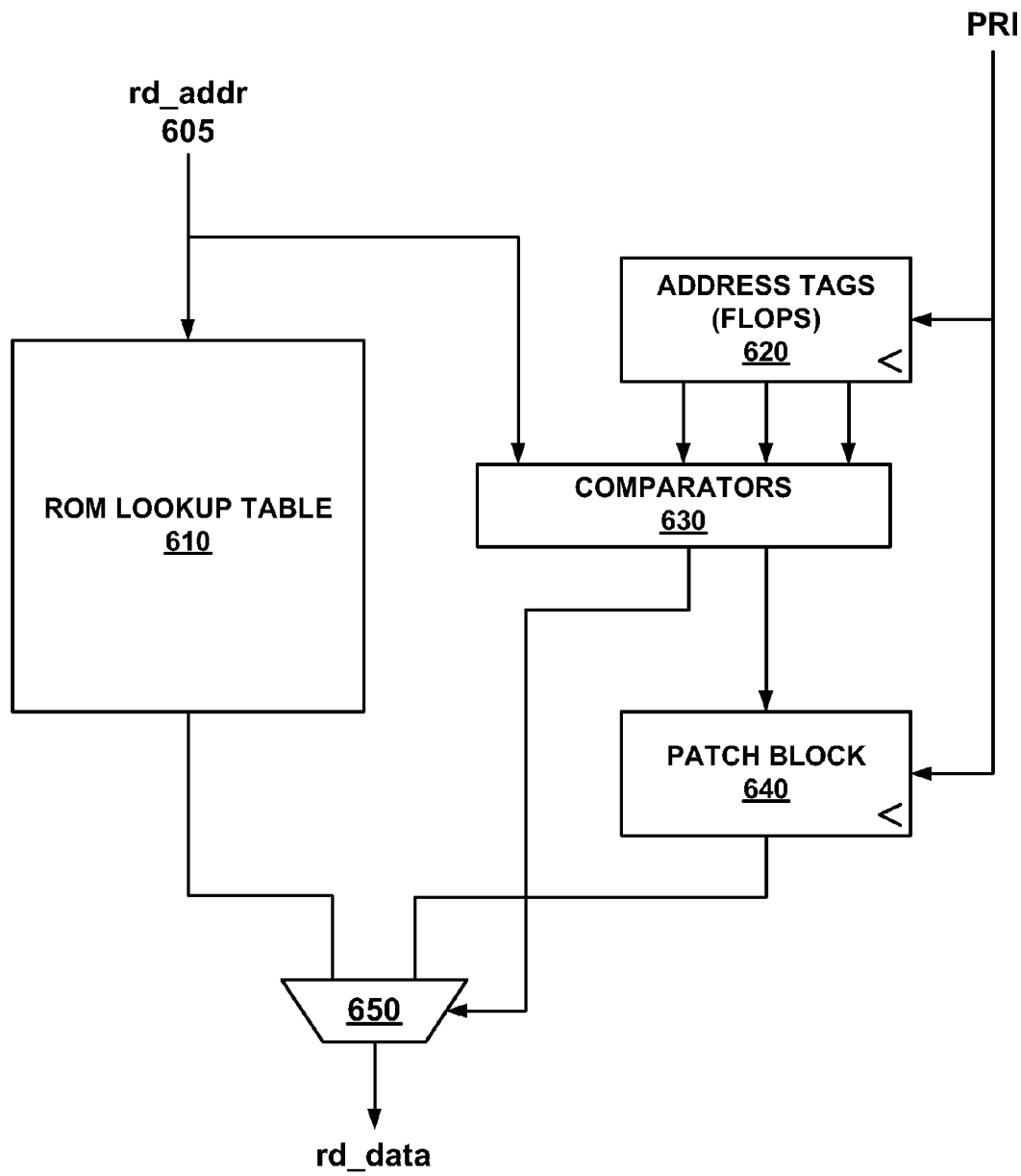
FIG. 6 is a data flow diagram of a scheduler including lookup tables that is capable of patching instructions through patching contents of the lookup tables, in accordance with one embodiment of the present invention.

FIG. 6 is a data flow diagram 600 illustrating the process by which a scheduler patches high level instructions used to schedule execution units in a shader pipeline of a graphics pipeline, in accordance with one embodiment of the present invention. In particular, the process for scheduling the execution of high level instructions can be patched to repair or modify existing instructions, or create new instructions.

The scheduler 600 includes a ROM lookup table 610. Entries in the ROM lookup table include execution information for a plurality of high level instructions. For instance, the ROM lookup table may include attributes in a decode table, or a program of instructions in an expansion table. As shown in diagram 600, a read address command is received by the ROM lookup table 610. The ROM lookup table 610 outputs the contents of the identified address, and sends it to a multiplexor 650.

In one embodiment, the ROM lookup table 610 is a decode lookup table. As described previously, the decode lookup table includes a plurality of entries providing attributes for a plurality of high level instructions in an instruction set of the shader pipeline. In part, the decode lookup table determines whether the high level instruction is a simple or complex instruction.

In another embodiment, the ROM lookup table 610 is an expansion lookup table. As described previously, the expansion lookup table provides an appropriate program of microcode for execution of high level instructions that are complex.

In still another embodiment, the ROM lookup table includes a resource lookup table. As described previously, entries in the ROM lookup table each provide a list of execution units in the shader pipeline that are capable of executing a respective microcode associated with executing high level instructions.

In addition, the read address command is received by the comparators 630. The comparators 630 are communicatively coupled to access the address tags 620. A respective comparator in the comparators 630 compares the address that is accessed in the ROM lookup table to the address tags 620. The address tags 620 each identify an address in the ROM lookup table 610 whose contents are tagged for patching. The respective comparator informs the multiplexor 650 if the accessed address is tagged for patching. That is, the respective comparator informs the multiplexor 650 when the accessed address is also included in the list of addresses in the address tags 620.

If there is a match, such that the accessed address is tagged for patching, the respective comparator is able to identify an associated register in the patch block 640. The patch block 640 includes a plurality of patch values for replacing contents of addresses that are tagged in the ROM lookup table. As such, the associated register includes the patch value for replacing the contents of the accessed address in the ROM lookup table. That is, the contents of the accessed address in the ROM lookup table can be patched by storing a patch value in the associated register. Additionally, a valid bit is necessary to indicate that the patch value is valid. As a result, an entry address, a patch value, and a valid bit are needed to enable a patch. This applies to all patchable lookup tables.

The multiplexor 650 is coupled to receive data from the ROM lookup table 610, the comparators 630 and the patch block 640. The multiplexor 650 selects between the contents of the address accessed in the ROM lookup table 610 and the patch value in the patch block 640.

Specifically, the multiplexor selects the accessed contents in the ROM lookup table 610 when said address is not tagged for patching. As such, the contents of the accessed address are used for further processing of the high level instruction. On the other hand, the multiplexor 650 selects the corresponding patch value when the address accessed in the ROM lookup table 610 is tagged for patching. That is, the multiplexor 650 includes a circuit for selecting the corresponding patch value. In that case, the patch value is used for further processing of the high level instruction.

In still another embodiment, the patch value is selected by the multiplexor when a valid bit is enabled for the patch value. When the valid bit is enabled, the multiplexor selects the patch value to replace the contents of the accessed address in the ROM lookup table 610. On the other hand, if the valid bit is not enabled, then the multiplexor selects the contents of the accessed address in the ROM lookup table 610 for further processing of the high level instruction.

Accordingly, the present invention provides, in various embodiments, a method and system for patching instructions in a shader pipeline of a 3-D graphics pipeline. The present invention provides for the repair, modification, and introduction of new high level instructions within the scheduling process that transforms a stream of high level instructions (e.g., operational codes) into a stream of very long instruction words (VLIWs) that are then executed within the shader pipeline of a 3-D graphics pipeline. In its various embodiments, the present invention can significantly expand the functionality of the scheduling process of a shader by supporting high level instructions that can be repaired or modified, and creating new instructions through a multistage scheduling process that is implemented with patchable ROM lookup tables.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A method for processing instructions in a video/graphics pipeline unit, comprising:
   a) accessing an address in a patchable lookup table for executing a high level instruction in said graphics pipeline, wherein said address is used to read contents of said address;
   b) in response to said accessing, determining if said address is tagged for patching;
   c) accessing an associated register to read a patch value if said address is tagged for patching;
   d) replacing said contents of said address with said patch value, if said address is tagged for patching and if said patch value is valid, wherein said patch value is used to schedule said high level instruction in a shader pipeline of said graphics pipeline; and
   e) accessing said contents of said address to schedule said high level instruction in said shader pipeline of said graphics pipeline provided said address is not tagged for patching.

2. The method of claim 1, further comprising:
   patching said contents of said address in said lookup table by storing said patch value from said register.

3. The method of claim 2, wherein said accessing further comprises:
   determining if said high level instruction is a complex instruction; and
   accessing a patchable expansion lookup table to translate said high level instruction to a program of microcode comprising said microcode sequence if said high level instruction is complex.

4. The method of claim 1, wherein said b) further comprises:
   comparing said address to addresses in a list of tagged addresses.

5. The method of claim 1, wherein said lookup table is a ROM lookup table and comprises a decode table, and
   wherein a) further comprises:
      accessing said address to decode said high level instruction to determine an appropriate microcode sequence for execution of said high level instruction.

6. The method of claim 5, wherein said accessing further comprises:
   determining if said high level instruction is a simple instruction; and
   translating said high level instruction to a single corresponding microcode comprising said microcode sequence if said high level instruction is a simple instruction as stored in said patch value.

7. The method of claim 1, wherein said lookup table is a ROM lookup table and comprises an index table, and
   wherein a) further comprises:
      accessing said address to determine a corresponding entry in an expansion lookup table that translates said high level instruction to a program of microcode when said high level instruction is a complex instruction.

8. The method of claim 1, wherein said lookup table is a ROM lookup table and comprises an expansion table, and
   wherein a) further comprises:
      accessing said address to translate said high level instruction into a program of microcode.

9. The method of claim 8, wherein said program of microcode implements a new high level instruction.

10. The method of claim 1, wherein said lookup table is a ROM lookup table and comprises a resource table, and
    wherein a) further comprises:
       for a particular microcode associated with executing said high level instruction, determining the first available unit that can execute said particular microcode from a list of units in said shader pipeline provided in said address that can execute said microcode.

11. A scheduler with patchable instructions in a shader pipeline, comprising:
    a patchable decode table for translating a high level instruction to an appropriate microcode for execution of said high level instruction when said high level instruction is of a first type, and for providing access to a patchable expansion table when said high level instruction is of a second type;
    said patchable expansion table coupled to said patchable decode table for translating said high level instruction to a program of microcode when said high level instruction is of said second type; and
    a patchable resource lookup table coupled to said patchable expansion table for determining a first available unit that can execute a particular microcode associated with executing said high level instruction from a list of execution units in said shader pipeline that are capable of executing said microcode.

12. The scheduler of claim 11, further comprising:
    a patchable index table coupled to said patchable decode table for determining an appropriate address in said patchable expansion table associated with said high level instruction.

13. The scheduler of claim 11, wherein a patch value for an address in said patchable expansion table comprises a program of microcode to support new high level instructions.

14. The scheduler of claim 11, wherein each of said patchable decode table, said patchable expansion table, and said patchable resource table comprises a ROM lookup table, and wherein said scheduler further comprises:
- a plurality of address tags each associated with an address in said ROM lookup table whose contents are tagged for patching;
- a patch block comprising a plurality of patch values for replacing contents of addresses that are tagged in said ROM lookup table;
- at least one comparator coupled to said plurality of address tags and to said patch block for determining when accessed contents of an address in said ROM lookup table associated with a high level instruction are tagged for patching, and for determining a corresponding patch value for replacing said accessed contents of said address;
- a multiplexor coupled to said lookup table and said at least one comparator for selecting said accessed contents when said address is not tagged for patching, said multiplexor further comprising a circuit for selecting said corresponding patch value when said address is tagged for patching for further processing of said high level instruction.

15. A computer system comprising:
a processor for processing information; and
a computer readable memory coupled to said processor and containing program instructions that, when executed cause said processor to implement a method for processing instructions in a shader pipeline, comprising:
a) accessing an address in a patchable lookup table for execution information that is associated with a high level instruction related to said graphics pipeline, wherein said address is used to read contents of said address;
b) in response to said accessing, determining if said address is tagged for patching;
c) accessing an associated register to read a patch value if said address is tagged for patching; and
d) replacing said contents of said address with said patch value, if said address is tagged for patching and if said patch value is valid, for further processing said patch value of said address associated with said high level instruction, wherein said patch value is used to schedule said high level instruction in said shader pipeline.

16. The computer system of claim 15, wherein said method further comprises:
patching said contents of said address in said lookup table by storing said patch value in said register.

17. The computer system of claim 15, wherein said lookup table is a ROM lookup table and comprises a decode table, and
wherein a) in said method further comprises:
accessing said address to decode said high level instruction to determine an appropriate microcode sequence for execution of said high level instruction.

18. The computer system of claim 17, wherein said accessing in said method further comprises:
determining if said high level instruction is a simple instruction; and
translating said high level instruction to a single corresponding microcode comprising said microcode sequence if said high level instruction is a simple instruction as stored in said patch value.

19. The computer system of claim 17, wherein said accessing in said method further comprises:
determining if said high level instruction is a complex instruction; and
accessing a patchable expansion lookup table to translate said high level instruction to a program of microcode comprising said microcode sequence if said high level instruction is complex.

20. The computer system of claim 15, wherein said lookup table is a ROM lookup table and comprises an index table, and
wherein a) in said method further comprises:
accessing said address to determine a corresponding entry in an expansion lookup table that translates said high level instruction to a program of microcode when said high level instruction is a complex instruction.

21. The computer system of claim 15, wherein said lookup table is a ROM lookup table and comprises an expansion table, and
wherein a) in said method further comprises:
accessing said address to translate said high level instruction into a program of microcode.

22. The computer system of claim 21, wherein said program of microcode implements a new high level instruction.

23. The computer system of claim 15, wherein said lookup table is a ROM lookup table and comprises a resource table, and
wherein a) in said method further comprises:
for a particular microcode associated with executing said high level instruction, determining the first available unit that can execute said particular microcode from a list of units in said video/graphic pipeline provided in said address that can execute said microcode.

* * * * *